US011978091B2

(12) United States Patent
Sheth et al.

(10) Patent No.: US 11,978,091 B2
(45) Date of Patent: May 7, 2024

(54) AUTOMATIC ASSOCIATION OF PRODUCTS AND SERVICES TO BE ADVERTISED WITH QUERIES UPON WHICH TO ADVERTISE THEM, WITHOUT MANUAL SELECTION OF QUERY TERMS

(71) Applicant: Google LLC, Mountain View, CA (US)

(72) Inventors: Alok Anilkumar Sheth, Rutherford, NJ (US); Enoch Chee-Lok Lau, Brooklyn, NY (US); Brett Alexander Benowitz, Allendale, NJ (US); Dharma Muppalla, Sunnyvale, CA (US); Noah Ronald Freeman, Boston, MA (US); Eric Lo, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/957,537

(22) Filed: Sep. 30, 2022

(65) Prior Publication Data

US 2024/0112222 A1 Apr. 4, 2024

(51) Int. Cl.
*G06Q 30/0273* (2023.01)
*G06F 40/247* (2020.01)
*G06Q 30/0241* (2023.01)

(52) U.S. Cl.
CPC ....... *G06Q 30/0275* (2013.01); *G06F 40/247* (2020.01); *G06Q 30/0276* (2013.01); *G06Q 30/0277* (2013.01)

(58) Field of Classification Search
CPC ........... G06Q 30/0275; G06Q 30/0276; G06Q 30/0277; G06F 40/247
See application file for complete search history.

(56) References Cited

U.S. PATENT DOCUMENTS 7,647,299 B2 * 1/2010 Harik ................... G06F 16/951
707/999.003
8,484,208 B1 * 7/2013 Raghavan ............. G06F 16/248
707/728

(Continued)

OTHER PUBLICATIONS

"The 3 Types of Sponsored Ads: Easy Seller'sGuide to Advertise on Amazon", [online] [retrieved Aug. 2, 2022]. Retrieved from the Internet: URL:https://www.advertisemint.com/advertise-on-amazon-sponsored-ads-product-brand-display/>, 18 pages.

(Continued)

*Primary Examiner* — Michael I Ezewoko
(74) *Attorney, Agent, or Firm* — Lerner David LLP

(57) ABSTRACT

The technology generally relates to automatically associating products and services to be advertised in response to a search query and providing sponsored advertisements for output with the search query results on a publisher's website or mobile application. An ad advertiser may create an ad campaign for products without including or identifying keywords associated with the product. Upon receiving a request for an advertisement, an ad server may generate synonyms, or keywords, for the terms in the request. The ad server generated keywords may be used to identify available products that match, or are relevant to, the search query. The ad server may determine a quality of the match and, based on the quality, determine which products are most relevant to the search query. The ad server may solicit bids from the advertisers of the relevant ad campaigns. The winning ads may be returned to the publisher for output.

16 Claims, 10 Drawing Sheets

(56) References Cited

U.S. PATENT DOCUMENTS

| | | | |
|---|---|---|---|
| 8,606,635 B2 | 12/2013 | Evankovich et al. | |
| 9,015,150 B2* | 4/2015 | Raghavan | G06F 16/838 |
| | | | 709/230 |
| 9,720,883 B2* | 8/2017 | Kan | H04L 67/2866 |
| 10,192,238 B2* | 1/2019 | Chatwin | G06Q 30/0256 |
| 10,346,879 B2* | 7/2019 | Solomon | G06Q 30/0277 |
| 10,600,084 B2* | 3/2020 | Kramer | G06F 16/951 |
| 10,896,214 B2* | 1/2021 | Kummamuru | G06F 16/951 |
| 11,176,605 B2 | 11/2021 | Feuerstein et al. | |
| 11,244,009 B2* | 2/2022 | Horesh | G06F 16/313 |
| 11,383,173 B2* | 7/2022 | Holmdahl | A63F 13/69 |
| 11,468,998 B2* | 10/2022 | Koblick | G06N 3/006 |
| 11,526,808 B2* | 12/2022 | Etkin | G16H 10/60 |
| 11,593,409 B2* | 2/2023 | Gentilcore | G06F 21/31 |
| 11,790,104 B2* | 10/2023 | Gentilcore | G06F 16/9535 |
| | | | 726/27 |
| 11,797,612 B2* | 10/2023 | Zhou | G06F 16/90332 |
| 11,803,556 B1* | 10/2023 | Samdani | G06N 20/00 |
| 11,826,663 B2* | 11/2023 | Holmdahl | A63F 13/48 |
| 2013/0282710 A1* | 10/2013 | Raghavan | G06F 16/838 |
| | | | 707/728 |
| 2014/0278959 A1* | 9/2014 | Nukala | G06Q 30/0277 |
| | | | 705/14.49 |
| 2015/0379571 A1* | 12/2015 | Grbovic | G06Q 30/0256 |
| | | | 705/14.54 |
| 2019/0370397 A1* | 12/2019 | Kummamuru | G06F 40/295 |
| 2020/0111578 A1* | 4/2020 | Koblick | G16H 80/00 |
| 2020/0401938 A1* | 12/2020 | Etkin | G16H 50/30 |
| 2021/0240781 A1* | 8/2021 | Horesh | G06F 16/90344 |
| 2022/0035868 A1* | 2/2022 | Holmdahl | A63F 13/67 |
| 2022/0179914 A1* | 6/2022 | Horesh | G06F 16/90344 |
| 2022/0261445 A1* | 8/2022 | Gentilcore | G06F 16/90344 |
| 2022/0261492 A1* | 8/2022 | Gentilcore | G06F 16/9535 |
| 2022/0269703 A1* | 8/2022 | Gentilcore | G06F 16/24578 |
| 2022/0323872 A1* | 10/2022 | Holmdahl | G06N 3/045 |
| 2023/0099588 A1* | 3/2023 | Zhou | G06F 16/90335 |
| | | | 707/765 |
| 2023/0103076 A1* | 3/2023 | Zhou | G06F 21/6218 |
| | | | 726/1 |
| 2023/0385340 A1* | 11/2023 | Boué | G06N 3/08 |

OTHER PUBLICATIONS

Co, Nicasio III, "Amazon Product Display Ads: How to Advertise Without Using Keywords", [online] [retrieved Aug. 2, 2022]. Retrieved from the internet: <URL:https://sellerinteractive.com/blog/how-to-advertise-without-using-keywords/.html>, Jul. 17, 2021, 8 pages.

"Support your next product launch with sponsored ads", [online] [retrieved Aug. 2, 2022]. Retrieved from the Internet: <URL:https://support-your-next-product-launch-with-sponsored-ads-en_us.html>, 42 pages.

* cited by examiner

Available Products 316

Product 1

Product 2

Product 3

Product 4

Product 5

Product 6

AUTOMATIC ASSOCIATION OF PRODUCTS AND SERVICES TO BE ADVERTISED WITH QUERIES UPON WHICH TO ADVERTISE THEM, WITHOUT MANUAL SELECTION OF QUERY TERMS

BACKGROUND

Sponsored advertisements typically appear on a retailer's website or mobile application alongside organic search results when a user performs a search or browses a product category. When creating ad campaigns for sponsored ads, advertisers often have to enter keywords, which are intended to capture all variations of possible searches for the product or service associated with the ad. This is cumbersome as advertisers have to think of all possible variations and search terms in an effort to have their sponsored ad selected. Moreover, advertisers typically have to manually map keywords to a product, which makes it difficult to be comprehensive or accurate when trying to differentiate between products with similar terms, e.g., milk chocolate and chocolate milk. This may be cumbersome for the advertisers and inefficient.

BRIEF SUMMARY

The technology generally relates to providing sponsored advertisements on a publisher's website or mobile application based on a user query or content filter on the publisher's website or mobile application. The user's query or content filter may be used to automatically identify associated products and services to the user's query or content filter. For example, an ad server may identify associated products and services using language processing to identify keywords related to the user's query or content filter, wherein the keywords include synonyms, spell-correction, or related terms to those in the user's query. To determine one or more sponsored advertisements to transmit to the publisher, the ad server may identify available products or services being advertised by the publisher. The ad server matches the available products or services to the keywords or synonyms identified using the language processing. The ad server may determine a score, such as a quality score, for each match. The quality score may provide an indication of how similar the available product or service is to the search query or the keywords generated by the ad server. For example, a high score may indicate that the available product or service is what users associate with the query, content filter, or ad server generated keyword. The ad server may rank the identified products and services based on the quality score. The ad server may solicit bids from advertisers for the highest ranked products or services. The winning ads may be returned to the publisher for output in addition to the search results.

One aspect of the technology is directed to a method comprising receiving, by one or more processors, campaign information associated with one or more advertising campaigns from advertisers, wherein the campaign information includes a selection of one or more products for each advertising campaign without requiring a listing of keywords associated with the one or more products, receiving, by the one or more processors from a publisher, a request for a sponsored advertisement for display on a content page of a publisher, the request associated with a search query or content filter received by the publisher, determining, by the one or more processors based on the search query, ad server generated keywords, matching, by the one or more processors, the ad server generated keywords to one or more available products, identifying, by the one or more processors, at least one product based on a degree of matching between the ad server generated keywords and the one or more available products, and identifying, by the one or more processors, at least one of the one or more advertising campaigns that includes the identified at least one product.

Receiving the request for the sponsored advertisement may further include receiving, by the one or more processors, at least one search term or category associated with the search query or content filter on the content page of the publisher. Determining the one or more ad server generated keywords may further include determining, by the one or more processors using language processing, one or more synonyms for each search term of the search query.

Determining the one or more ad server generated keywords may further include at least one of: identifying, by the one or more processors using the language processing, one or more keywords associated with each search term of the search query, and spell checking, by the one or more processors using the language processing, each search term of the search query.

When matching the ad server generated keywords to the one or more available products, the method may further comprise: comparing, by the one or more processors, the ad server generated keywords to one or more available products, and generating, by the one or more processors based on the comparison, the degree of the match. The degree of the match is an indication of how much the matched available product corresponds to at least one search term or category associated with the search query or content filter. A trained machine learning model generates the degree of the match by comparing the one or more available products to historical user responses.

The method may further comprise ranking, by the one or more processors based on the determined degree of the match, the one or more available products. The method may further comprise receiving, by the one or more processors from the advertisers of the identified at least one or more advertising campaigns, bids on the highest ranked one or more available products; and providing, by the one or more processors for output on the content page of the publisher based on a winning bid, the at least one advertising campaign as an advertisement.

A trained machine learning model may generate the ad server generated keywords.

Another aspect of the technology is directed to a system comprising one or more processors. The one or more processors may be configured to receive campaign information associated with one or more advertising campaigns from advertisers, wherein the campaign information includes a selection of one or more products for each advertising campaign without requiring a listing of keywords associated with the one or more products, receive, from a publisher, a request for a sponsored advertisement for display on a content page of a publisher, the request associated with a search query or content filter received by the publisher, determine, based on the search query, ad server generated keywords, match the ad server generated keywords to one or more available products, identify at least one product based on a degree of matching between the ad server generated keywords and the one or more available products, and identify at least one of the one or more advertising campaigns that includes the identified at least one product.

Yet another aspect of the technology is directed to a non-transitory computer-readable medium storing instructions, which when executed by one or more processors, cause the one or more processors to: receive campaign information associated with one or more advertising campaigns from advertisers, wherein the campaign information includes a selection of one or more products for each advertising campaign without requiring a listing of keywords associated with the one or more products, receive, from a publisher, a request for a sponsored advertisement for display on a content page of a publisher, the request associated with a search query or content filter received by the publisher, determine, based on the search query, ad server generated keywords, match the ad server generated keywords to one or more available products, identify at least one product based on a degree of matching between the ad server generated keywords and the one or more available products, and identify at least one of the one or more advertising campaigns that includes the identified at least one product.

DETAILED DESCRIPTION

Figure 1:
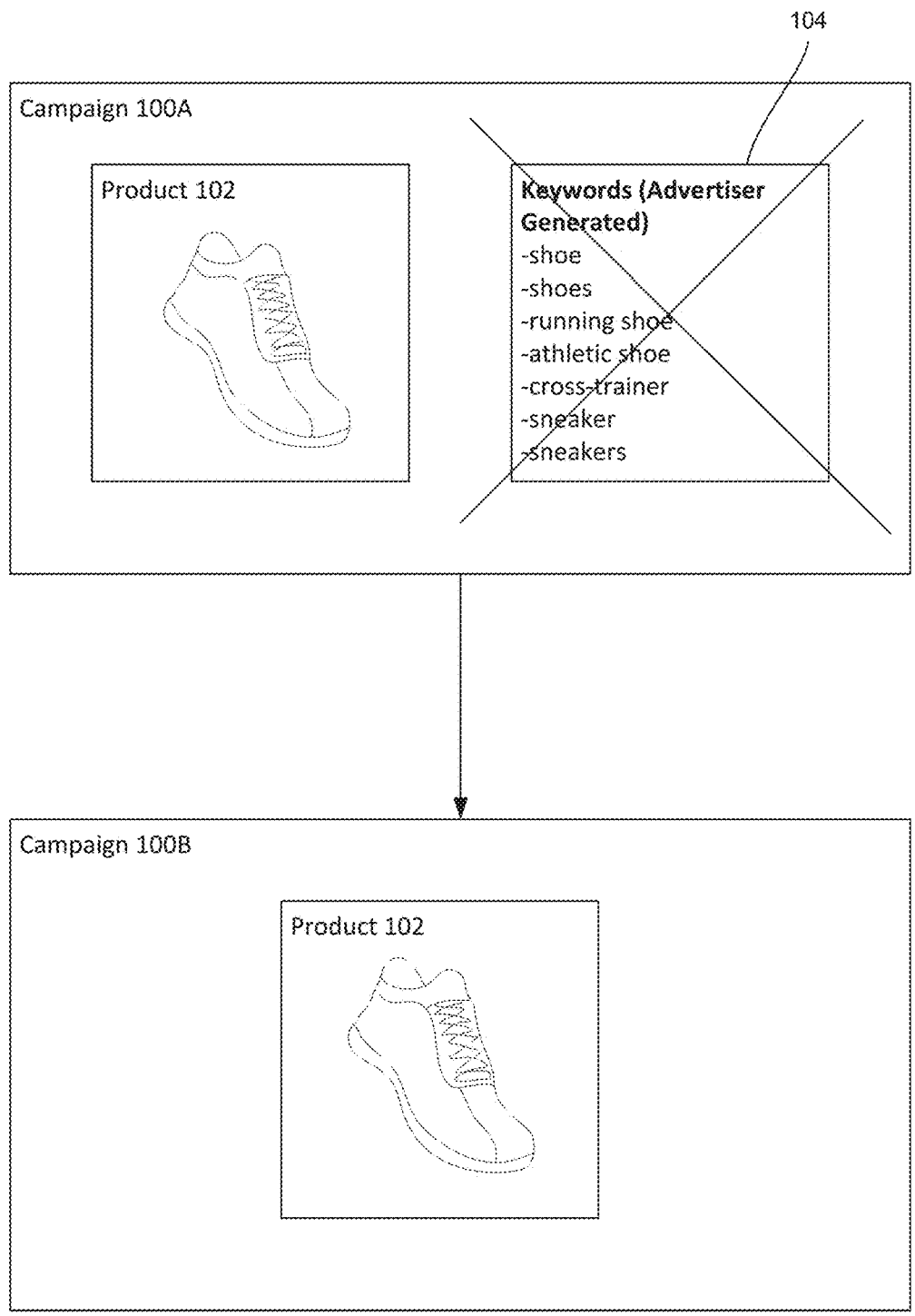
FIG. 1 is a pictorial representation of an advertisement campaign that does not require advertiser generated keywords according to aspects of the disclosure.

The technology generally relates to providing sponsored advertisements on a publisher's website or mobile application based on an advertisement ("ad") campaign created by an advertiser. The advertisements may be for products, services, organizations, ideas, messages, etc. being offered by the publisher or retailer. Sponsored ads may be an ad on which an advertiser has bid to have displayed on the publisher's website. Sponsored ads may enable the advertiser to target a receptive user by identifying ads relevant to a user's query. For example, an advertiser may create an ad campaign for one or more products, services, etc. without generating keywords themselves. The ad campaigns may be received by an ad server. The ad server may receive an ad request for sponsored ads from a publisher. The ad request may correspond to a search query received by the publisher. The ad server may use language processing for the terms in the search query to dynamically generate one or more keywords related to the search query. For example, the keywords may be generated in response to receiving the ad request using synonyms of terms in the search query, spelling correction of terms in the search query, and or machine learning based on historical customer clicks in connection with similar search queries. The ad server may identify products or services that are available for advertisement on the publisher's website or mobile application. The ad server may match the available products and services to the search query and/or ad generated keywords. According to some examples, each match may have a quality score indicating a likelihood that the product or service is what users associate with the search query. The ad server may rank the available products and services based on their quality score. The ad server may solicit bids from advertisers for the highest ranked products and services. At the conclusion of the bidding, the ad server may return the winning ads to the publisher for output.

The advertiser may be, for example, a manufacturer, retailer, service provider, etc. The advertiser may create ad campaigns for products or services on the publisher's website. According to some examples, the ad campaigns may be for sponsored or featured products on the publisher's website. The publisher may be, for example, a retailer or a search engine. The publisher may maintain a catalog of products or services offered by the publisher. According to some examples, the publisher may identify which products or services are available to be sponsored. For purposes of ease and clarity throughout the specification, products, services, messages, ideas, etc. may be collectively referred to as "products."

By having the ad server generate the keywords in response to receiving a search query, as opposed to advertisers entering the keywords when creating the ad campaigns, the overhead of managing keywords manually when an advertiser creates ad campaigns may be reduced. Additionally or alternatively, having the ad server generate the keywords using language processing may reduce the amount of time it takes to create ad campaigns by no longer requiring the advertiser to manually formulate every variation of keywords to be included. Moreover, the ad server generated keywords in response to a search query may be more comprehensive for identifying relevant products and services and, therefore, ad campaigns in response to a publisher's request for sponsored advertisements and may allow for greater accuracy by the ad server.

Figure 7:
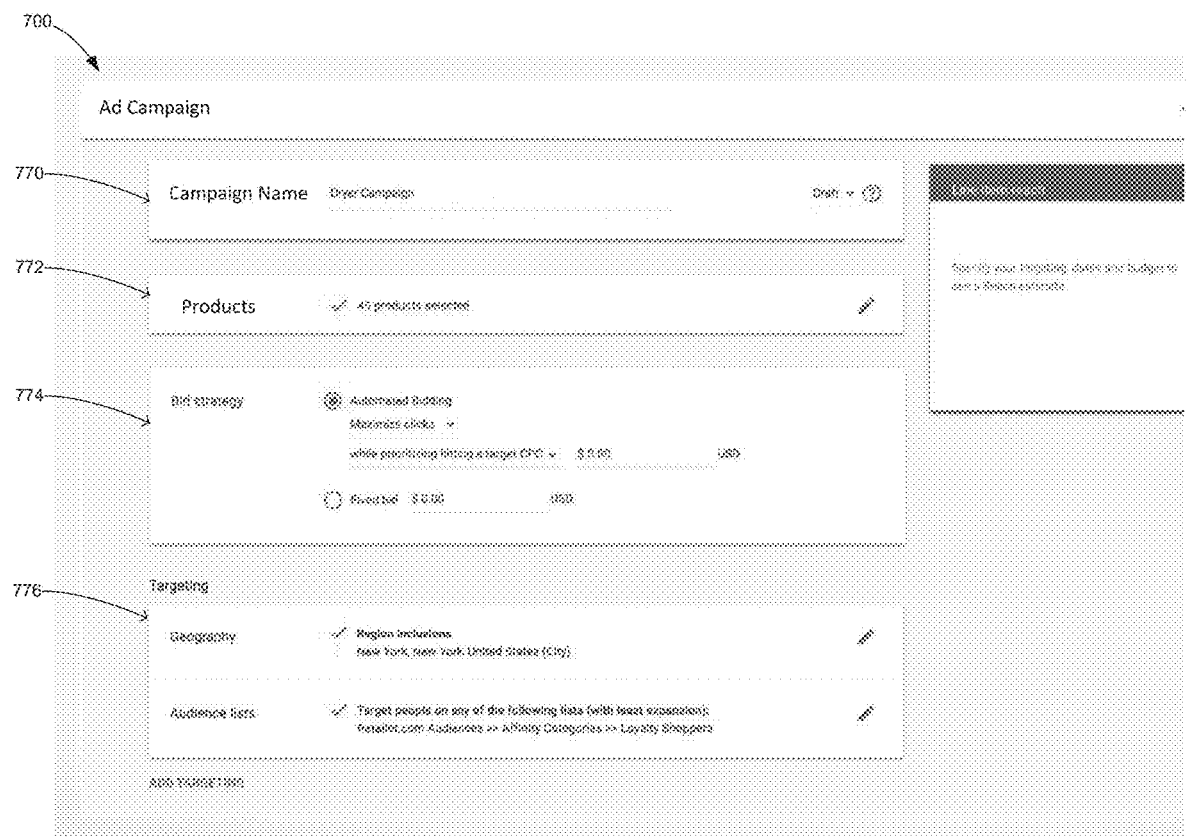
FIG. 7 is a screenshot illustrating an example user interface for creating an ad campaign according to aspects of the disclosure.

FIG. 1 illustrates the removal of a need for the advertiser to manually enter keywords for an ad campaign. Ad campaign 100A represents a typical ad campaign, including an identification of a product 102, shown as a shoe, and a list of advertiser generated keywords 104. In conventional systems, the advertiser, looking to promote the shoes in response to a greater number of search queries, would enter keywords including different brands, models, features, colors, types of shoes (e.g., running, athletics, cross-trainers, etc.), variations of the word "shoe" (e.g., shoe, shoes, sneaker, sneakers, etc.), as part of the ad campaign 100A. This may be cumbersome and time consuming, and ineffective if the advertiser does not include enough or the right keywords. The present disclosure provides an ability for the advertiser to promote the product 102, such as the shoe, through ad campaign 100B that does not require manual entry of associated keywords. To negate the need for an advertiser to identify all relevant keywords for an ad campaign, the advertiser may instead select a product 102 to be included in the ad campaign 100B. While the advertiser may optionally provide additional details regarding the ad campaign, as shown in FIG. 7 and discussed below, the advertiser does not need to generate or provide any keywords.

Figure 2:
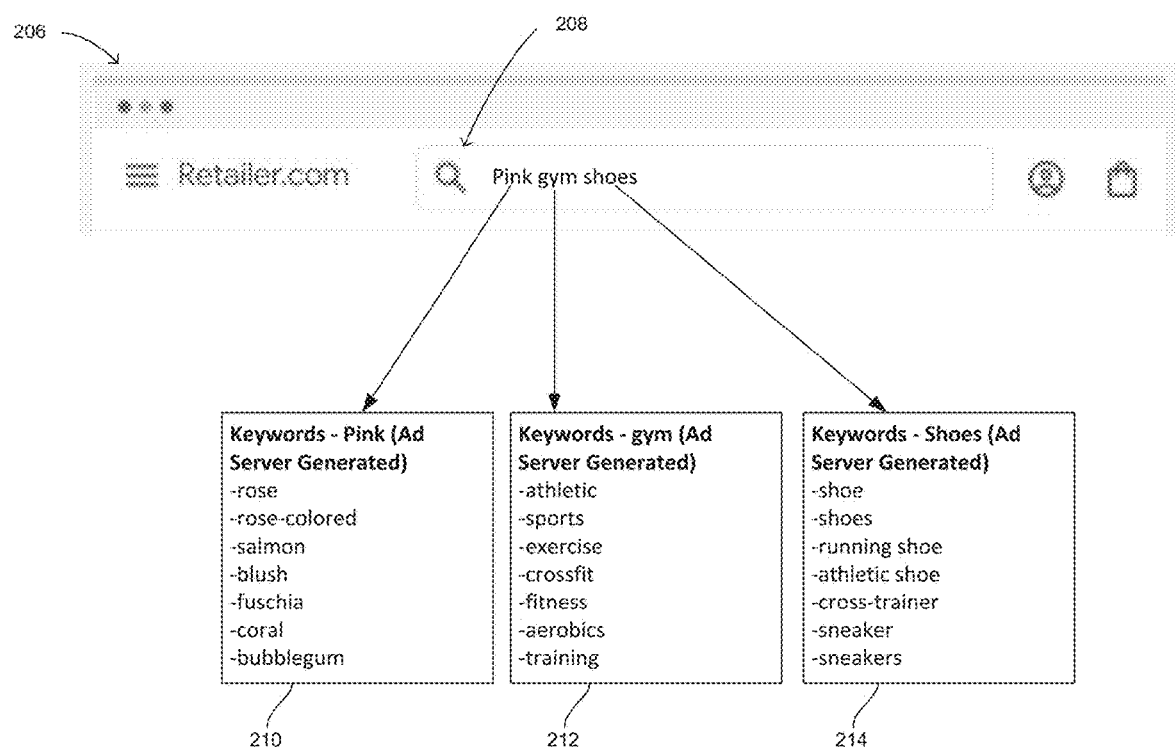
FIG. 2 is a pictorial representation of ad server generated keywords in response to an advertisement request from a publisher according to aspects of the disclosure.

FIG. 2 is a partial screenshot illustrating a search query received by a publisher. For example, the publisher's website 206, or mobile application (not shown), may receive a search query in a search field 208. As shown, the search query may be for "pink gym shoes." The publisher may transmit an ad request to the ad server for sponsored advertisements to be presented to the user in addition to the search results. The ad request may be based on the search query for "pink gym shoes." For example, the ad request may include a request for sponsored ads corresponding to or associated with pink gym shoes.

The ad server receives the ad request, including the terms of the search query, e.g., "pink gym shoes," and automatically generates related search terms, such as by using machine learning. For example, the ad server may use language processing for the query "pink gym shoes" to provide any spell correction, identify synonyms for each term and/or the entire query, identify terms associated with the terms in the search query, etc. For example, the ad server may automatically generate, without user input, keywords 210-214 for "pink", "gym", and "shoes". According to some examples, the keywords may be synonyms for the term, such as rose or blush for pink, or variations or the term, such as shoe or sneaker for "shoes". The ad server may use the ad server generated keywords 210-214 to identify relevant ad campaigns. For example, the ad server generated keywords 210-214 may be compared with the all products or ad campaigns that can be displayed by the publisher to determine a best match.

According to some examples, the ad server generated keywords may be a list of synonyms, keywords, or terms associated with previously searched terms. For example, after determining the ad server generated keywords for "pink", "gym", and "shoes", the ad server may store the ad server generated keywords for future searches.

In some examples, the ad server generated keywords may be generated dynamically in response to receiving an ad request. For example, the ad server generated keywords may be generated as part of the matching operation between the search terms of the search query and the available products without storing the keywords.

Figure 3:
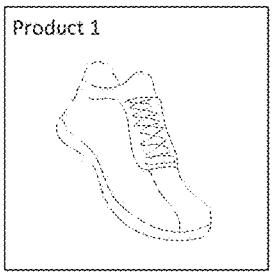
FIG. 3 is a pictorial representation of available products according to aspects of the disclosure.
Figure 3:
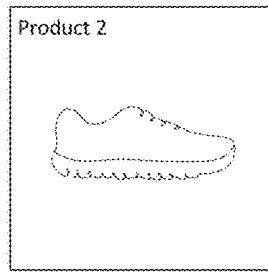
Figure 3:
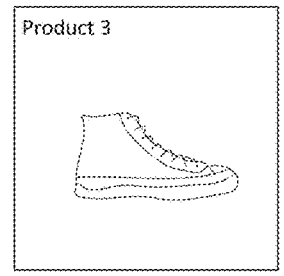
Figure 3:
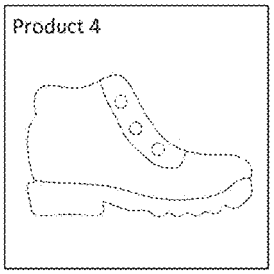
Figure 3:
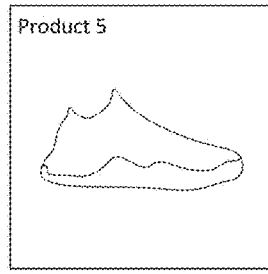
Figure 3:
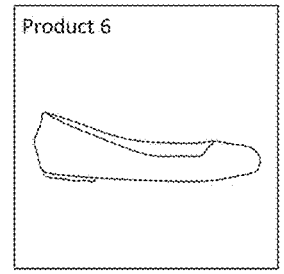

FIG. 3 illustrates an example set of products that can be advertised on the publisher's website or mobile application. The ad server may identify one or more available products 316 to be advertised in response to the ad request. According to some examples, the ad server may identify available products 316 based on the ad server generated keywords 210-214 generated in response to the ad request. The ad server may match the available products 316 with the ad server generated keywords 210-214. For example, based on the ad server generated keywords for "pink gym shoes", the ad server may identify, at least, Products 1-6. While only Products 1-6 are shown as available products 316 that match the ad server generated keywords 210-214, more than six products may be identified. Additionally or alternatively, while Products 1-6 are shown as tiles, the matching products may be shown in a list, as icons, etc. and may include additional details, such as the brand and/or product name, product details, content ID, etc. Therefore, Products 1-6, as shown in FIG. 3, is just one example and is not intended to be limiting.

The ad server may determine a quality of the match between the available products 316 and the ad server generated keywords. The quality of the match may be, for example, a quality score. The quality score may provide an indication of the likelihood that the available product 316 is what the user associates with the terms of the search query. User association between products and search terms may be based on previous user responses. Previous user responses may include, for example, clicks or selections of products in response to previous search queries.

According to some examples, the ad server may determine the quality score for each match using a trained machine learning ("ML") model. The trained ML model may compare the available product to one or more training models to determine whether the available product corresponds to what users associate with the query terms. The input features to the ML model may include user associations with products and search terms. For example, if a user search query was for "shoes" and users typically selected "sneakers" in response to previous search queries, the ML model may be trained to score matches including "sneakers" higher than other available shoes, such as "boots."

Figure 4:
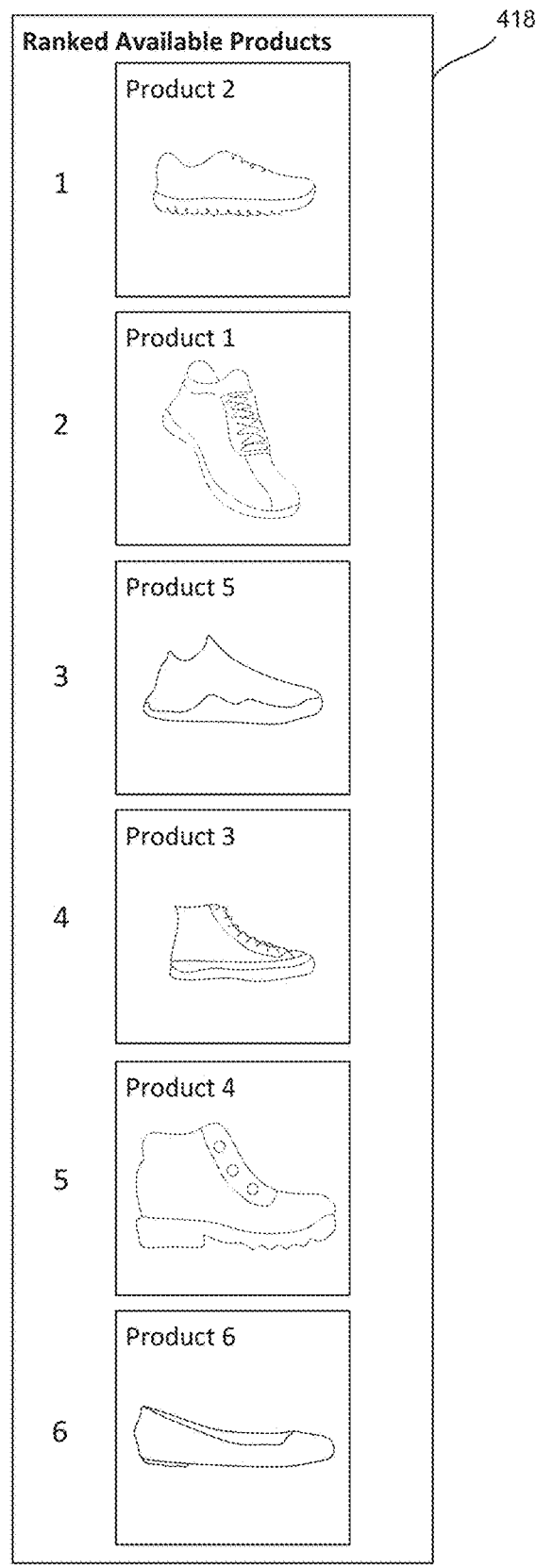
FIG. 4 is a pictorial representation of the available products of FIG. 3 ranked according to aspects of the disclosure.

FIG. 4 illustrates an example in which the available products have been ranked. According to some examples, the available products may be ranked 418 based on their quality score. A higher rank may indicate that the available product is a better match to the keywords generated by the ad server and/or to the user search query or content filter on the publisher's website or mobile application. According to some examples, a higher rank may indicate the available product is more relevant to the keywords generated by the ad server and/or to the user search query or content filter on the publisher's website or mobile application.

As shown, Products 1-6 have been ranked 418. Product 2 is ranked number 1, which may indicate that Product 2 is the most relevant and/or has the highest quality score and Product 6 is ranked number 6, which may indicate that Product 6 is the least relevant and/or has the lower quality score of the ranked available products 418. Between Product 2 and Product 6, Product 1 may be ranked number two, Product 5 may be ranked number three, Product 3 may be ranked number 4, and Product 4 may be ranked number 5.

According to some examples, the products may be ranked based on bids from the advertisers. For example, when creating the advertising campaigns, advertisers may set a maximum bid or a maximum incremental bid for a given product. The maximum bid or increments may correspond to the amount per click the advertiser is willing to pay for the given product. The products may, therefore, be ranked based on advertisers willingness to pay per click for the product.

Product 2 may be, for example, an athletic shoe that comes in "flamingo pink". The ad server generated keywords may have identified "athletic shoe" as a synonym for "gym shoe" and "flamingo" as a synonym for "pink". The trained ML model may determine, based on previous user responses, that users searching for gym shoes typically click or select athletic shoes. According to some examples, the trained ML model may determine, based on previous user responses, that users searching for "pink" typically click or select products with the color "flamingo." The ML model may, therefore, have assigned Product 2 a high score for the match between "flamingo athletic shoe" and the search query "pink gym shoe."

Product 6 may be, for example, a ballet flat that is available in blush. The ad server generated keywords may have identified "dancing" or "ballet" as a synonym for "gym" and "blush" as a synonym for "pink." The trained ML model may determine, based on previous user responses, that users search for gym shoes do not click or select "ballet shoes" when searching for "gym shoes." The ML model may, therefore, have assigned Product 6 a lower score for the match between "blush ballet shoe" and the search query "pink gym shoe."

While FIG. 4 illustrates the ranked available products 418 as a list of tiles for the available products, the ranked available products 418 may be a list including the details for each available product, such as the brand and/or product name, product details, available features, etc. In some examples, the ranked available products 418 may not include an image or pictorial representation of the products. The ranked available products 418 maybe shown in grid formation, such as the formation of FIG. 3, with an indication of the rank. Therefore, the ranked available products 418, as shown in FIG. 4, is just one example and is not intended to be limiting.

The ad server may solicit bids on the highest ranking available products. The highest ranking available products may be products that are most relevant to the user search query received by the publisher's website or mobile application. Advertisers may bid to have their ad campaign associated with the ranked available products displayed on the publisher's website or mobile application alongside the search results. According to some examples, the budding may occur automatically based on a bid strategy the advertisers included in the ad campaign for the product.

Figure 5A:
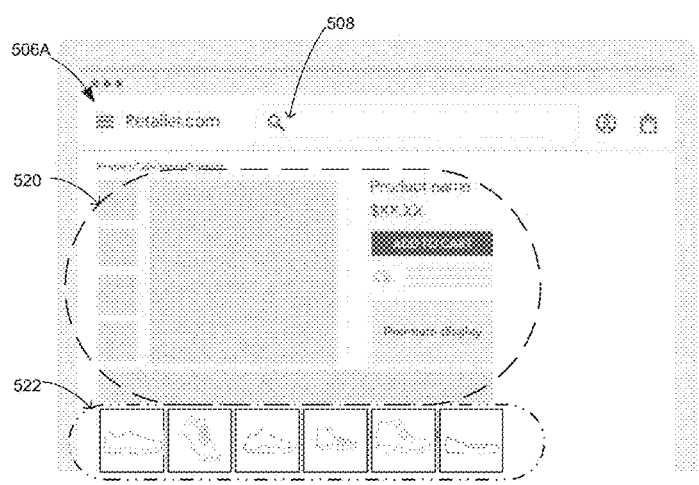
FIG. 5A is a screenshot illustrating an example arrangement of content output via a webpage according to aspects of the disclosure.
Figure 5B:
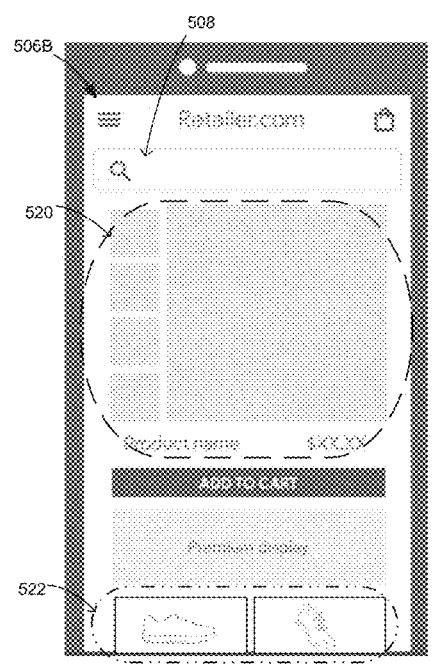
FIG. 5B is a screenshot illustrating an example arrangement of content output via a mobile application according to aspects of the disclosure.

FIGS. 5A and 5B are screenshots of a publisher's website and publisher's mobile application, respectively, illustrating an example arrangement of content. The content may be provided in response to a user search query or content filter. The content may include, for example, details for one or more products 520, identification of related products, sponsored advertisements 522, etc. The publisher may be, for example, a retailer offering products for consumption by users.

The publisher's website 506A and/or the publisher's mobile application 506B may include a search field 508. A user may enter a search query into search field 508 to search a publisher's catalog of offered products. The search query may include search terms, such as a product name or type. Continuing with the example discussed in FIG. 2, the search query may be for "pink gym shoes" such that the search terms are "pink," "gym," and "shoes."

In response to receiving the search query, the publisher may transmit an ad request to the ad server for sponsored advertisements. The ad request may include the search terms of the search query. The ad server may identify relevant sponsored ads 522 based on the search terms of the search query, as discussed above with respect to FIGS. 2-4. For example, the ad server may generate synonyms, or keywords, for the search terms. The ad server generated keywords may be used to identify relevant available products offered by the retailer. The ad server may score the match between the search terms and the identified available products. The score may be based on the quality of the match, such as whether the available product is what users associate with the search terms. The ad server may rank the available products based on their score. The ad server may solicit bids from advertisers for the highest ranked products. The ad server may select the ad campaign from the advertiser with the winning bid. The selected ad campaigns may be transmitted to the retailer to be published as sponsored ads 522 alongside the search results, e.g., product 520.

Figure 6:
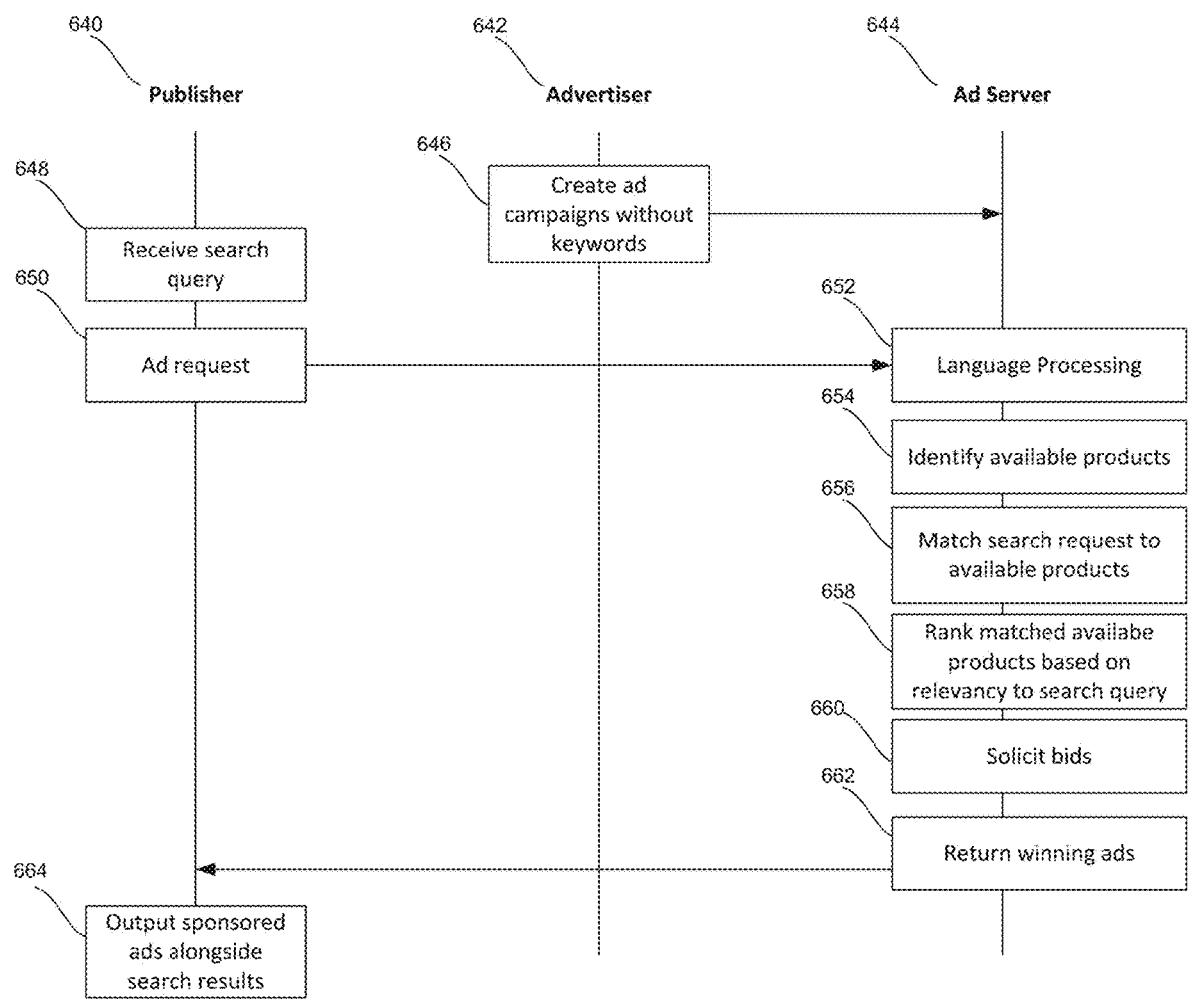
FIG. 6 is a sequence diagram according to aspects of the disclosure

FIG. 6 is an example sequence diagram of steps that may occur among a publisher, an advertiser, and an ad server. The following operations do not have to be performed in the precise order described below. Rather, various operations can be handled in a different order or simultaneously, and operations may be added or omitted.

In block 646, the advertiser 442 may create one or more ad campaigns, as discussed below with respect to FIGS. 7 and 8. For example, the advertiser 642 may select one or more products from a publisher's 640 catalog. The publisher's catalog may include a plurality of products that can be sponsored by the advertiser 642. Unlike typical systems that request advertisers to provide or include keywords associated with the products included in the ad campaign, the advertiser 642 does not have to provide or include keywords associated with the selected products. The advertiser 642 may submit the ad campaigns to the ad server 644. The ad server 644 may store the ad campaigns.

In block 648, the publisher 640 may receive a search query through the publisher's website or mobile application. The search query may be a user submitted search query for a particular product or type of product. Continuing with the examples above in FIGS. 2-5, the search query may be for "pink gym shoes."

In block 650, in response to receiving the search request, the publisher 640 may transmit an ad request to the ad server 644 for sponsored ads to be displayed alongside the search results for "pink gym shoes."

In block 652, the ad server 644 may use language processing to correct any spelling errors in the search terms, as necessary, and identify synonyms, or keywords, associated with the search terms. For example, the ad server 644 may generate a list of keywords for "pink", "gym", and "shoes", as shown in FIG. 2. According to some examples, the keywords may include variations of the word, such as "sneaker" and "sneakers".

In block 654, the ad server 644 may identify available products being offered by the publisher 640. The available products may be products that are available to be a sponsored ad.

In block 656 the ad server 644 may match the search query to the available products. For example, the ad server 644 may match the ad server generated keywords to the available products. The matched available products may be products that are relevant, related, or associated with the ad server generated keywords.

In block 658, the ad server 644 may rank the matched available products based on the relevancy to the search query. The relevancy of the available products may be based on a quality of the match, or a quality score. The quality score may provide an indication that the available product is what a user typically associates with the search query. For example, if the user search query is for "pink gym shoes" and, in response to previous search queries users typically click or select products identified as athletic shoes or cross-trainers, the ad server 644 may score available products that are athletic shoes or cross-trainers higher than hiking boots or high-top sneakers. According to some examples, the ad server 644 may use a trained ML model to determine the quality score. The trained ML model may use prior clicks or selections in response to search queries as input into the ML model. The trained ML model may, based on the training examples, determine a quality score for the matches.

The ad server 644 may rank the matches based on the quality score. For example, a higher quality score may indicate the available product is often associated with the search query. In some examples, a higher quality score may indicate that the available product is highly relevant to the search query. In contrast, a lower quality score may indicate that the available product is not often associated with the search query and/or is not likely to be relevant to the search query.

In block 660, the ad server 644 may solicit bids from ad campaigns that contain the relevant content IDs. In some examples, the ad servers 644 may solicit bids from the advertisers 642 of the identified relevant ad campaigns. The advertisers 642 may bid to have their ad campaign displayed on the publisher's website in response to the search request. According to some examples, the bidding may occur automatically based on the bid strategy the advertisers 642 included in the ad campaigns.

In block 662, after the conclusion of the bidding, the ad server 644 may return the winning ad campaigns to the publisher 640.

In block 664, the publisher may output the sponsored ads alongside the search results. An example output is shown in FIGS. 5A and 5B.

FIG. 7 is a screenshot illustrating an example user interface for creating ad campaigns. The user interface 700 may include one or more input fields. The input fields may be configured to receive details relating to the ad campaign. As shown, the input fields include are related to the campaign name 770, products 772, bid strategy 774, and targeting 776. The interface 700 may include additional input fields not shown, such as campaign duration, publisher information, budgets, etc.

The campaign name 710 may allow for the advertiser to name the ad campaign. The name of the ad campaign may be used when the ad server identifies relevant ads to be output by the publisher. In some examples, the campaign name may be used internally by the publisher to track previous and active ad campaigns. The advertiser may enter information into the campaign name field. The system may receive the campaign name via inputs from a keyboard, microphone, touch screen, etc.

The products 712 may be products that the advertiser selected to sponsor in one or more ad campaigns. The products 712 may be entered by the advertiser and/or selected from a merchant's product catalog. The merchant may, in some examples, correspond to the publisher.

Figure 8:
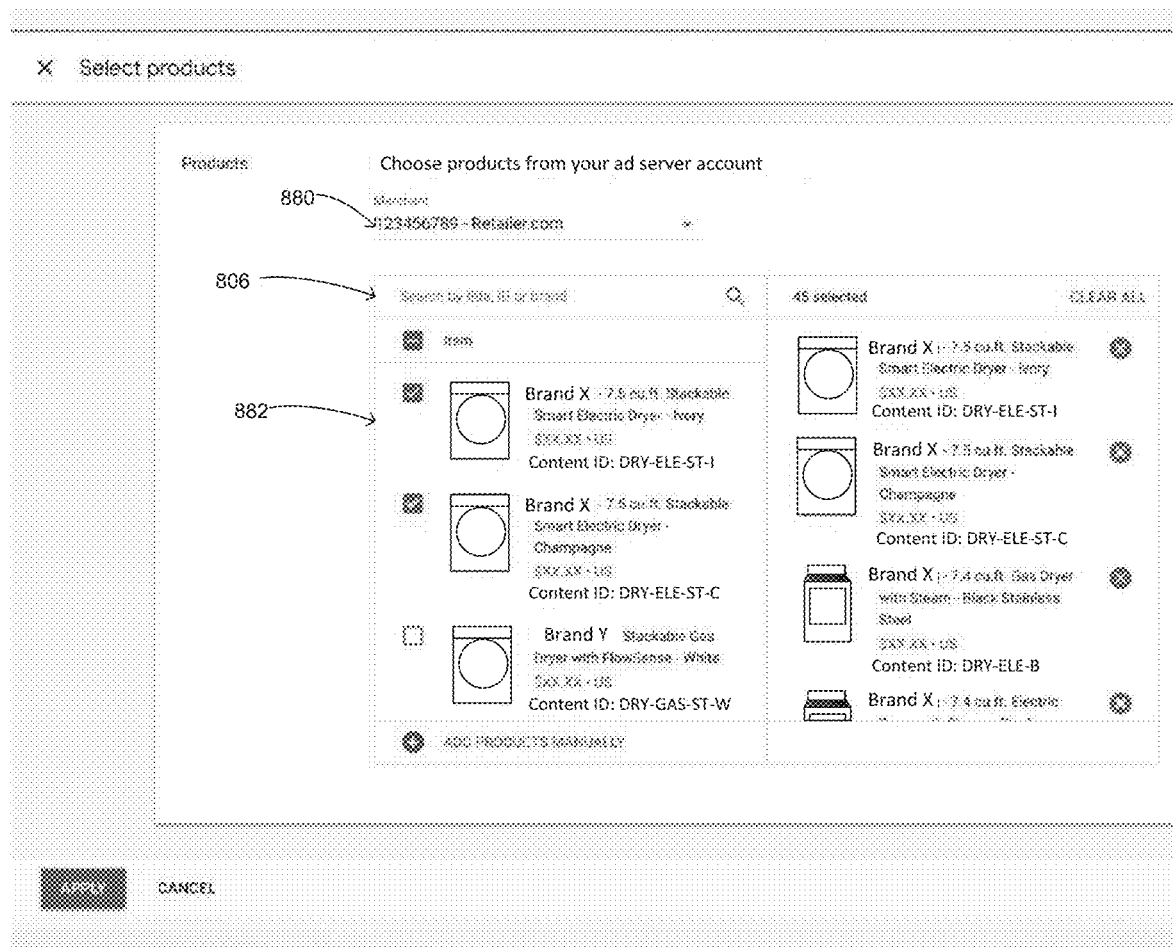
FIG. 8 is a pictorial representation of an example product catalog according to aspects of the disclosure.

As shown in FIG. 8, the advertiser may select a merchant 880 that is offering items to be sponsored. The advertiser may identify one or more products from the publisher's catalog 882 that are the targets of sponsored ads. The products in the catalog 882 may be a specific product but may, additionally or alternatively, include brands, manufacturers, a type of product, etc. According to some examples, the advertiser may be able to search the publisher's catalog 882. For example, the advertiser may enter search terms into search field 806. The search terms may be a title, ID, brand, etc., related to a product that will be the target of sponsored ads. The system may identify one or more products in the publisher's catalog 318 that are relevant to the search terms.

As shown in FIG. 8, the advertiser may have searched the publisher's catalog 882 for products related to dryers. The advertiser may identify a type of product, such a dryer, a brand or manufacturer of products, a specific product, such a brand, size, and type of dryer, etc. The product type, brand, specific product, etc. may be associated with at least one content ID, such as a barcode, QR-code, alpha-numeric code, or any other identifier that is used by an ad server to match the ad campaign to an ad request, as discussed herein. The content ID may be associated with the product before the advertiser selects the products. According to some examples the content ID may be based on the product feed that described the product to be sold by the publisher. The content ID for a given product may be unique for a given publisher. In some examples, the content ID for a given product may be the same for a plurality of publishers offering the given product.

According to some examples, the ad campaign may include bid strategy 774. For example, the ad campaign may define a cost per selection, a maximum cost per selection, a cost per conversion, a maximum cost per conversion, etc. In some examples, the ad campaign may include targeting options 776, such as a relevant geographic region for the ad campaign, a target audience, etc. Additionally, or alternatively, the ad campaign may include a start date and an end date.

The ad server may receive the ad campaigns from the advertiser. The ad server may receive a request from a publisher for one or more sponsored ads to be displayed alongside the search results of a search query received by the publisher's website. The ad server may generate synonyms, or keywords, for the search terms of the search query. The ad server may generate the keywords using language processing. The ad server generated keywords may be used to identify relevant advertisements in response to the search query.

Ad server generated keywords a given search query may negate the need for advertisers to provide keywords as part of the ad campaign. In this regard, the ad server may determine synonyms and variations, e.g., keywords, for the search terms in the search query. In previous systems, an advertiser looking to target dryers would typically have to enter keywords including all the different brands, type of dryer, such as gas and electric, variations of the word "dryer", such as dryers, drier, driers, etc., as part of their ad campaign. This may be cumbersome and ineffective if the advertiser does not include numerous keywords. To negate the need for an advertiser to identify all relevant keywords for an ad campaign, the advertiser may instead select products from the publisher's catalog and the ad server may generate keywords in response to a search query. The ad server generated keywords may be used to identify relevant products and, therefore, ad campaigns to be provided in response to the search query. As such, the ad server generated keywords may be used to automatically identify relevant ad campaigns without the need for an advertiser to consider and include keywords in the ad campaign.

Figure 9:
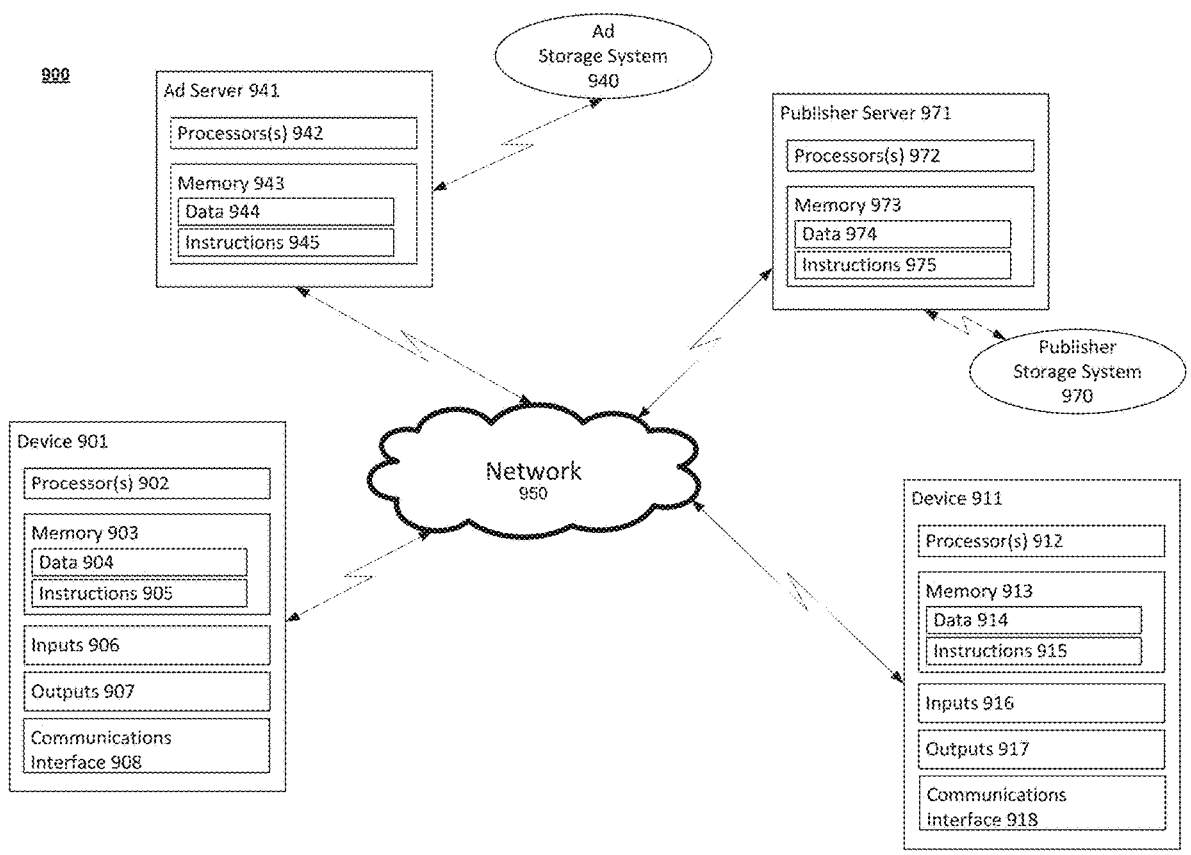
FIG. 9 is a functional diagram illustrating an example system according to aspects of the disclosure.

FIG. 9 illustrates an example system in which the features described above and herein may be implemented. It should not be considered as limiting the scope of the disclosure or usefulness of the features described herein. In this example, system 900 includes devices 901, 911, ad servers 941, ad server storage system 940, publisher server 971, publisher storage system 970, and network 950. For purposes of clarity, devices 901, 911 will be described with respect to device 901. However, it should be understood that device 911 may include the same or similar components and mat function in substantially the same way.

Device 901 may include one or more processors 902, memory 903, data 904 and instructions 905. Device 901 may also include inputs 906, outputs 907, and a communications interface 908. The devices 901 may be, for example, a smart phone, tablet, laptop, smart watch, AR/VR headset, smart helmet, home assistant, etc.

Memory 903 of device 901 may store information that is accessible by processor 902. Memory 903 may also include data that can be retrieved, manipulated or stored by the processor 902. The memory 903 may be of any non-transitory type capable of storing information accessible by the processor 902, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. Memory 903 may store information that is accessible by the processors 902, including instructions 905 that may be executed by processors 902, and data 904.

Data 904 may be retrieved, stored or modified by processors 902 in accordance with instructions 905. For instance, although the present disclosure is not limited by a particular data structure, the data 904 may be stored in computer registers, in a relational database as a table having a plurality of different fields and records, XML documents, or flat files. The data 904 may also be formatted in a computer-readable format such as, but not limited to, binary values, ASCII or Unicode. By further way of example only, the data 504 may comprise information sufficient to identify the relevant information, such as numbers, descriptive text, proprietary codes, pointers, references to data stored in other memories (including other network locations) or information that is used by a function to calculate the relevant data.

The instructions 905 can be any set of instructions to be executed directly, such as machine code, or indirectly, such as scripts, by the processor 902. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The one or more processors 902 may include any conventional processors, such as a commercially available CPU or microprocessor. Alternatively, the processor can be a dedicated component such as an ASIC or other hardware-based processor. Although not necessary, device 501 may include specialized hardware components to perform specific computing functions faster or more efficiently.

Although FIG. 9 functionally illustrates the processor, memory, and other elements of device 901 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of device 901. Accordingly, references to a processor or device will be understood to include references to a collection of processors or devices or memories that may or may not operate in parallel.

The inputs 906 may be, for example, a mouse, keyboard, touch-screen, microphone, or any other type of input. The inputs may receive key words for a search on a publisher's website or mobile application.

Output 907 may be a display, such as a monitor having a screen, a touch-screen, a projector, or a television. The display 907 of the device 901 may electronically display information to a user via a graphical user interface ("GUI") or other types of user interfaces. For example, display 907 may electronically display product information and sponsored ads on a publisher's website or mobile application.

The devices 901 can be at various nodes of a network 950 and capable of directly and indirectly communicating with other nodes of network 550. Although two devices are depicted in FIG. 9, it should be appreciated that a typical system can include one or more computing devices, with each computing device being at a different node of network 950. The network 950 and intervening nodes described herein can be interconnected using various protocols and systems, such that the network can be part of the Internet, World Wide Web, specific intranets, wide area networks, or local networks. The network 950 can utilize standard communications protocols, such as WiFi, Bluetooth, 4G, 5G, etc., that are proprietary to one or more companies. Although certain advantages are obtained when information is transmitted or received as noted above, other aspects of the subject matter described herein are not limited to any particular manner of transmission.

System 900 may include one or more server computing devices, such as ad server 541 and publisher server 971. The server computing devices may be, for example, a load balanced server farm, that exchange information with different nodes of a network for the purpose of receiving, processing and transmitting the data to and from other computing devices. For instance, ad server 941 and publisher server 971 may be a web server that is capable of communicating with the device 901 via the network 950. In addition, ad server 941 and publisher server 971 may use network 950 to transmit and present information to a user of device 901. Ad server 941 and publisher server 971 may include one or more processors 942, 972, memory 943, 973, data 944, 974, instructions 945, 975, etc. These components operate in the same or similar fashion as those described above with respect to device 901.

Ad server 941 may manage content, such as sponsored ads, and provide various services to the advertisers, publishers, and devices 901. According to some examples, ad server 941 may receive ad campaigns from one or more advertisers. The ad campaigns may include campaign information, such as the products to be sponsored, bidding strategy, targeting information, duration, etc. The ad campaigns may be stored in the memory 943 of ad server 941 and/or in ad server storage system 940.

According to some examples, publisher server 971 may receive a search query from device 901. For example, the search query may be for specific content, such as product information. In response to the request, publisher server 971 may retrieve relevant content from publisher storage system 970. The publisher server 971 may transmit a content page or other presentation, representation, or characterization of the content to the requesting device 901. The content page may include, for example, sponsored ads.

According to some examples, in response to the received search query, publisher server 971 may transmit an ad request to ad server 941. Ad server 941 may facilitate the identification of relevant ads for distribution to the publishers. For example, ad server 941 may generate synonyms, or keywords, for the search terms in the search query. The ad server 541 may identify available products for the publisher. The ad server 541 may identify relevant available products based on the ad server generated keywords. For example, the ad server 541 may match the available products to the ad server generated keywords. The ad server 541 may, in some examples, determine a quality of the match, such as a quality score. The quality score may provide an indication that the available product is relevant to the search terms. For example, a higher quality score may indicate that the available product is often associated with the search terms based on historical clicks or selections in response to a previous search query. Advertisers may bid on the highest ranked available products with their ad campaigns to have their ad campaign provided on the content page transmitted to device 901 from publisher server 971.

Device 901 may present in a viewer, such as a browser, mobile application, or other content display system, the search query results integrated with one or more of the sponsored ads provided by the ad server 941.

Figure 10:
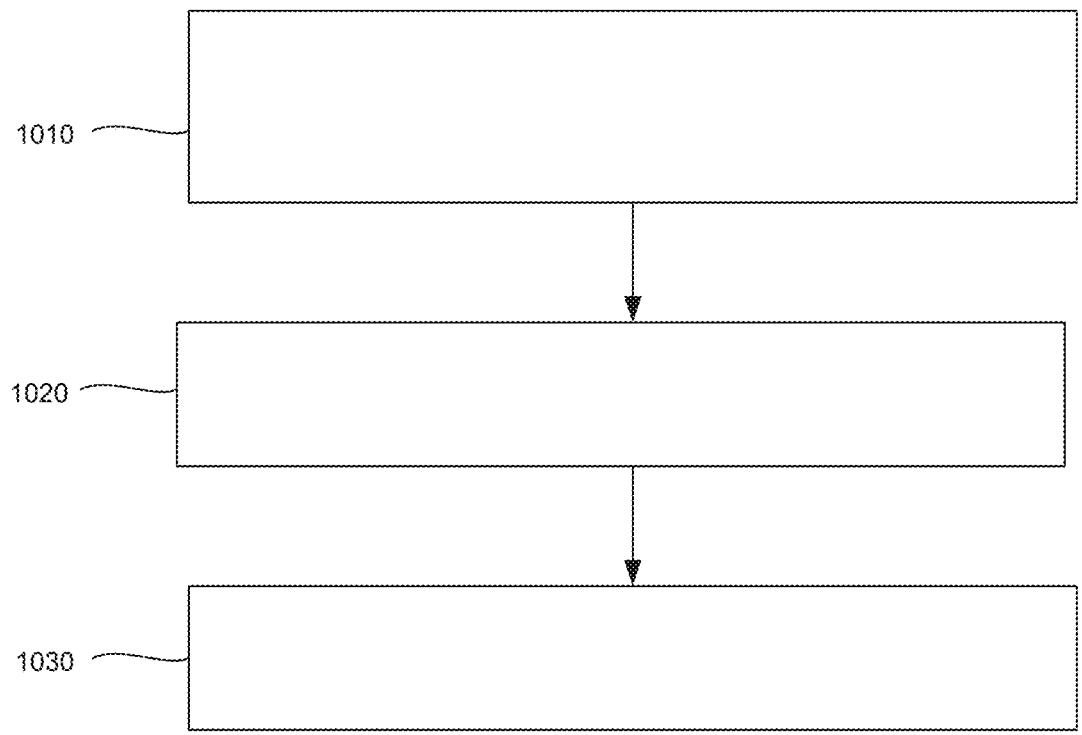
FIG. 10 is a flow diagram illustrating an example method of identifying advertising campaigns according to aspects of the disclosure.

FIG. 10 illustrates an example method for identifying ad campaigns. The following operations do not have to be performed in the precise order described below. Rather, various operations can be handled in a different order or simultaneously, and operations may be added or omitted.

In block 1010, the system may receive campaign information associated with one or more advertising campaigns from advertisers. The campaign information may include a selection of one or more products for each advertising campaign without requiring a listing of keywords associated with the one or more products. According to some examples, the system may receive the products being offered by the publisher. For example, the system may receive the publisher's catalog of products that are offered by the published. The products may include at least one of a type of product, a specific product, a type of service, or a specific service.

In block 1020, the system may receive a request for a sponsored advertisement for display on a content page of a publisher. The request may be associated with a search query or content filter received by the publisher. According to some examples, receiving the request for the sponsored advertisement may further include receiving at least one search term or category associated with the search query or content filter on the content page of the publisher.

In block 1030, the system may determine, based on the search query, ad server generated keywords. According to some examples, determining the ad server generated keywords may be done using language processing. The system may use language processing to determine one or more synonyms for each search term of the search query. In some examples, a trained machine learning model may generate the ad server generated keywords.

In some examples, determining the ad server generated keywords includes identifying, using language processing, one or more keywords associated with each term of the search query. For example, if they search query is for "shoe" a keyword associated with the search query may be "sock." In some examples, the system may use language processing to spell check each search term of the search query. After the terms are spell checked and corrected, if necessary, the system may determine ad server generated keywords.

In block 1040, the system may match the ad server generated keywords to one or more available products. The one or more available products may be products being offered by the publishers or retailer. According to some examples, when matching the ad server generated keywords to the available products, the system may compare the ad server generated keywords to the available products. In some examples, based on the comparison between the ad server generated keywords and the available products, the system may generate a degree of the match. The degree of the match may be an indication of how much the matched available product corresponds to the at least one search term or category associated with the search query or the content filter. According to some examples, a trained machine learning model may generate the degree of match. The trained machine learning model may compare the one or more available products to historical user responses.

In block 1050, the system may identify at least one product based on a degree of matching between the ad server generated keywords and the one or more available products.

In block 1060, the system may identify at least one of the one or more advertising campaigns that includes the identified at least one product.

According to some examples, the system may receive bids on the highest ranked one or more available products from the advertisers of the identified at least one or more advertising campaigns. The system may provide for output on the content page of the publisher, based on the winning bid, the at least one advertising campaign. The content page may include the search results in response to the search query as well as the sponsored advertisements.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, by one or more processors, campaign information associated with one or more advertising campaigns from advertisers, wherein the campaign information includes a selection of one or more products for each advertising campaign without requiring a listing of keywords associated with the one or more products;
receiving, by the one or more processors from a publisher in response to a search query or content filter received by the publisher, a request for a sponsored advertisement for display on a content page of a publisher, the request associated with the search query or content filter;
generating, by the one or more processors using language processing, in response to the request for the sponsored advertisement associated with the search query or content filter received by the publisher, one or more synonyms for each term of the search query or content filter received by the publisher, wherein the one or more synonyms correspond to ad server generated keywords and are based on the search query or the content filter received by the publisher,
wherein generating the one or more synonyms further includes at least one of:
identifying, by the one or more processors using the language processing, one or more keywords associated with each search term of the search query; and
spell checking, by the one or more processors using the language processing, each search term of the search query or content filter;
matching, by the one or more processors, the one or more synonyms to one or more available products;
determining, by the one or more processors executing a machine learning model, a degree of matching for the matches, wherein the machine learning model is trained based on associations with products and search terms;

identifying, by the one or more processors, at least one product based on the degree of matching between the one or more synonyms and the one or more available products; and identifying, by the one or more processors, at least one of the one or more advertising campaigns that includes the identified at least one product.

2. The method of claim 1, wherein receiving the request for the sponsored advertisement further includes receiving, by the one or more processors, at least one search term or category associated with the search query or content filter on the content page of the publisher.

3. The method of claim 1, wherein when matching the one or more synonyms to the one or more available products, the method further comprises:

comparing, by the one or more processors, the one or more synonyms to one or more available products; and generating, by the one or more processors based on the comparison, the degree of the match.

4. The method of claim 1, wherein the degree of the match is an indication of how much the matched available product corresponds to at least one search term or category associated with the search query or content filter.

5. The method of claim 1, wherein the machine learning model generates the degree of the match by comparing the one or more available products to historical user responses.

6. The method of claim 1, further comprising ranking, by the one or more processors based on the determined degree of the match, the one or more available products.

7. The method of claim 6, further comprising:

receiving, by the one or more processors from the advertisers of the identified at least one or more advertising campaigns, bids on the highest ranked one or more available products; and providing, by the one or more processors for output on the content page of the publisher based on a winning bid, the at least one advertising campaign as an advertisement.

8. The method of claim 1, wherein a trained machine learning model generates the ad server generated keywords.

9. A system, comprising:

one or more processors, the one or more processors configured to:

receive campaign information associated with one or more advertising campaigns from advertisers, wherein the campaign information includes a selection of one or more products for each advertising campaign without requiring a listing of keywords associated with the one or more products;

receive, from a publisher in response to a search query or content filter received by the publisher, a request for a sponsored advertisement for display on a content page of a publisher, the request associated with the search query or content filter;

generate, using language processing, in response to the request for the sponsored advertisement associated with the search query or content filter received by the publisher one or more synonyms for each term of the search query or content filter received by the publisher, wherein the one or more synonyms correspond to ad server generated keywords and are based on the search query or the content filter received by the publisher, wherein when generating the one or more synonyms the one or more processors are further configured to, using the language processing, at least one of:

identify one or more keywords associated with each search term of the search query; and spell check each search term of the search query or content filter;

match the one or more synonyms to one or more available products;

determine, by processors executing a machine learning model, a degree of matching for the matches, wherein the machine learning model is trained based on associations with products and search terms;

identify at least one product based on the degree of matching between the ad server generated keywords and the one or more available products; and identify at least one of the one or more advertising campaigns that includes the identified at least one product.

10. The system of claim 9, wherein when receiving the request for the sponsored advertisement, the one or more processors are further configured to receive at least one search term or category associated with the search query or content filter on the content page of the publisher.

11. The system of claim 9, wherein when matching the one or more synonyms to the one or more available products, the one or more processors are further configured to:

compare the one or more synonyms to one or more available products; and generate, based on the comparison, the degree of the match.

12. The system of claim 9, wherein the degree of the match is an indication of how much the matched available product corresponds to at least one search term or category associated with the search query or content filter.

13. The system of claim 9, wherein the machine learning model generates the degree of the match by comparing the one or more available products to historical user responses.

14. The system of claim 9, wherein the one or more processors are further configured to rank, based on the determined degree of the match, the one or more available products.

15. The system of claim 14, wherein the one or more processors are further configured to:

receive, from the advertisers of the identified at least one or more advertising campaigns, bids on the highest ranked one or more available products; and provide, for output on the content page of the publisher based on a winning bid, the at least one advertising campaign as an advertisement.

16. A non-transitory computer-readable medium storing instructions, which when executed by one or more processors, cause the one or more processors to:

receive campaign information associated with one or more advertising campaigns from advertisers, wherein the campaign information includes a selection of one or more products for each advertising campaign without requiring a listing of keywords associated with the one or more products;

receive, from a publisher in response to a search query or content filter received by the publisher, a request for a sponsored advertisement for display on a content page of a publisher, the request associated with the search query or content filter;

generate, using language processing, in response to the request for the sponsored advertisement associated with the search query or content filter received by the publisher, one or more synonyms for each term of the search query or content filter received by the publisher, wherein the one or more synonyms correspond to ad server generated keywords and are based on the search query or the content filter received by the publisher, wherein when generating the one or more synonyms the one or more processors are further configured to, using language processing, at least one of:
   identify one or more keywords associated with each search term of the search query; and
   spell check each search term of the search query or content filter;

match the one or more synonyms to one or more available products;

determine, by processors executing a machine learning model, a degree of matching for the matches, wherein the machine learning model is trained based on associations with products and search terms;

identify at least one product based on the degree of matching between the one or more synonyms and the one or more available products; and identify at least one of the one or more advertising campaigns that includes the identified at least one product.

* * * * *